(12) United States Patent
Dow et al.

(10) Patent No.: US 7,404,761 B2
(45) Date of Patent: Jul. 29, 2008

(54) STRAW CHOPPER WITH FAN HAVING ENHANCED AIR FLOW IN AN AGRICULTURAL COMBINE

(75) Inventors: Chad A. Dow, East Moline, IL (US); Mark L. Pearson, Le Claire, IA (US)

(73) Assignee: Deere & Company, Moline, IL (US)

( * ) Notice: Subject to any disclaimer, the term of this patent is extended or adjusted under 35 U.S.C. 154(b) by 167 days.

(21) Appl. No.: 11/193,937

(22) Filed: Jul. 29, 2005

(65) Prior Publication Data

US 2007/0026911 A1    Feb. 1, 2007

(51) Int. Cl.
*A01F 12/40* (2006.01)
(52) U.S. Cl. ...................................................... 460/112
(58) Field of Classification Search ................. 460/112, 460/111, 71, 901; 56/505, 504, 500; 239/668, 239/681, 243; 241/55, 79, 224, 240
See application file for complete search history.

(56) References Cited

U.S. PATENT DOCUMENTS

| | | | | | |
|---|---|---|---|---|---|
| 9,114 | A | * | 7/1852 | Gilbert | 460/71 |
| 3,025,067 | A | * | 3/1962 | Raney et al. | 239/658 |
| 3,103,241 | A | * | 9/1963 | Weigel | 241/55 |
| 3,380,502 | A | * | 4/1968 | Gronberg | 241/224 |
| 4,087,051 | A | | 5/1978 | Moeller | 241/27 |
| 4,696,432 | A | * | 9/1987 | Russ et al. | 241/101.742 |
| 5,232,405 | A | * | 8/1993 | Redekop et al. | 460/112 |
| 5,482,508 | A | * | 1/1996 | Redekop et al. | 460/112 |
| 6,120,373 | A | * | 9/2000 | Schrattenecker | 460/112 |
| 6,354,938 | B1 | * | 3/2002 | Schrattenecker | 460/112 |
| 6,478,674 | B2 | | 11/2002 | Redekop | 460/112 |
| 6,699,121 | B2 | * | 3/2004 | Bognar et al. | 460/112 |
| 6,840,854 | B2 | | 1/2005 | Redekop | 460/112 |
| 2004/0014511 | A1 | * | 1/2004 | Johnson et al. | 460/112 |
| 2004/0043804 | A1 | * | 3/2004 | Redekop | 460/112 |
| 2004/0259611 | A1 | | 12/2004 | Dow | 460/112 |
| 2006/0073861 | A1 | | 4/2006 | Lauer | 460/112 |

FOREIGN PATENT DOCUMENTS

| | | |
|---|---|---|
| DE | 3925701 | 2/1991 |
| DE | 102004049965 | 4/2006 |
| FR | 1427499 | 3/1965 |

* cited by examiner

*Primary Examiner*—Árpád Fábián-Kovács
(74) *Attorney, Agent, or Firm*—Taylor & Aust, P.C.

(57) ABSTRACT

A straw chopper for an agricultural harvesting unit includes a housing, and a rotor carried by the housing. The rotor includes a center chopping section and a pair of fans respectively positioned at longitudinally outboard ends of the center chopping section. Each fan includes a hub rotatable in a direction of rotation, and a plurality of fan blades connected with the hub at a plurality of angularly spaced locations about the hub. Each fan blade has a generally U-shaped portion with a rear wall and a pair of side walls extending from the rear wall in the direction of rotation.

21 Claims, 5 Drawing Sheets

STRAW CHOPPER WITH FAN HAVING ENHANCED AIR FLOW IN AN AGRICULTURAL COMBINE

FIELD OF THE INVENTION

The present invention relates to agricultural harvesting machines, such as combines, and, more particularly, to straw choppers for such combines.

BACKGROUND OF THE INVENTION

Straw Choppers are used on agricultural harvesting machines to reduce the size of crop material, other than grain, that is processed by the harvesting machine. Typically, the straw chopper includes a housing that encloses a rotor. The housing is provided with an inlet for receiving crop material other than grain that has been processed and an outlet for distributing the chopped crop material back to the field. The housing is also provided with a bank of stationary cutter knives. The rotor is provided with a plurality of pendulously mounted straw chopper blades that cooperate with the stationary knives to chop the crop material entering the straw chopper. The rotor typically includes a cylindrical tube having a plurality of blade mounts distributed around the periphery of the rotor. The straw chopper blades are pendulously mounted to the blade mounts.

It is known to provide a fan at each longitudinally outboard end of the chopper blades. The fan helps to cast the non-grain crop material from the rear of the combine. The fan may include fan blades having a generally L-shaped configuration, with one leg lying in a plane extending generally parallel to the direction of rotation, and a transverse leg lying in a plane extending generally perpendicular to the direction of rotation. The transverse leg has a radially extending edge which simply allows the air to flow around the edge and off the blade as the blade rotates during use.

What is needed in the art is a fan for a straw chopper having enhanced air flow.

SUMMARY OF THE INVENTION

The present invention provides a straw chopper with a fan having scoop shaped fan blades.

The invention comprises, in one form thereof, a fan for a straw chopper in an agricultural harvesting unit. The fan includes a hub rotatable in a direction of rotation, and a plurality of fan blades connected with the hub at a plurality of angularly spaced locations about the hub. Each fan blade has a generally U-shaped portion with a rear wall and a pair of side walls extending from the rear wall in the direction of rotation.

The invention comprises, in another form thereof, a straw chopper for an agricultural harvesting unit. The straw chopper includes a housing, and a rotor carried by the housing. The rotor includes a center chopping section and a pair of fans respectively positioned at longitudinally outboard ends of the center chopping section. Each fan includes a hub rotatable in a direction of rotation, and a plurality of fan blades connected with the hub at a plurality of angularly spaced locations about the hub. Each fan blade has a generally U-shaped portion with a rear wall and a pair of side walls extending from the rear wall in the direction of rotation.

DETAILED DESCRIPTION OF THE INVENTION

Figure 1:
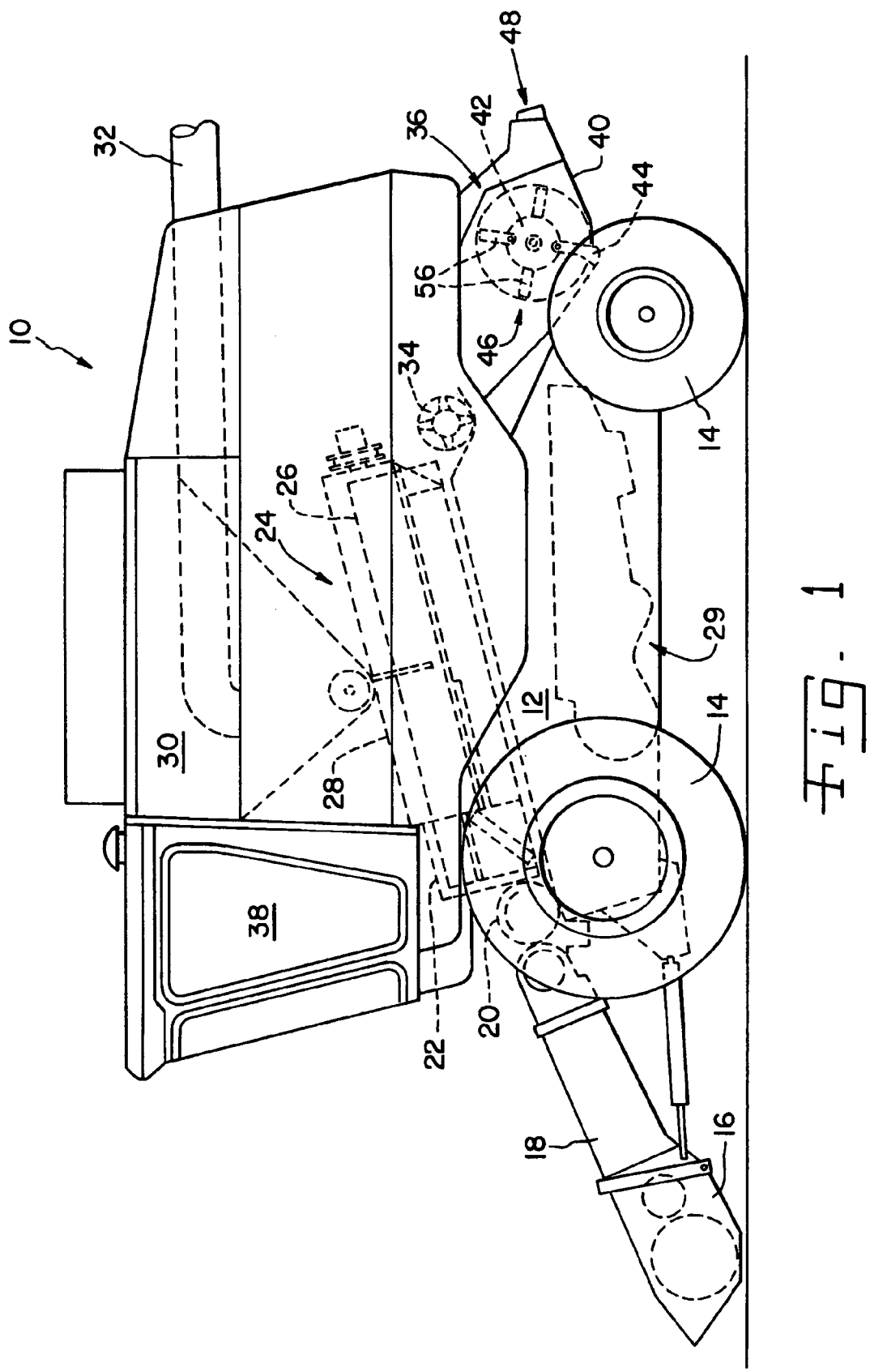
FIG. 1 is a side, schematic view of an agricultural harvesting machine including an embodiment of a straw chopper of the present invention.

FIG. 1 shows an agricultural harvesting machine in the form of a combine 10 including a supporting structure 12 having ground engaging wheels 14 extending from supporting structure 12. Although combine 10 is illustrated as having wheels 14, it could also have ground engaging tracks, either full tracks or half tracks. A harvesting platform 16 is used for harvesting a crop and directing it to a feederhouse 18. The harvested crop is directed by feederhouse 18 to an infeed beater 20, which directs the crop upwardly through an inlet transition section 22 to an axial crop processing unit 24.

Crop processing unit 24 threshes and separates the harvested crop material. Crop processing unit 24 includes a rotor 26 located inside a rotor housing 28. Rotor 26 includes a cylindrical rotor drum having a number of threshing elements for threshing the harvested crop material. Grain and chaff fall through grates on the bottom of crop processing unit 24 to cleaning system 9 which removes the chaff and directs the clean grain to a clean grain elevator (not shown). The clean grain elevator transports the clean grain to grain tank 30. The clean grain in tank 30 can be unloaded into a gravity wagon or truck by an unloading auger 32.

Crop material other than grain is expelled from axial crop processing unit 24 to discharge beater 34. Discharge beater 34 in turn propels the harvested crop material other than grain to straw chopper 36, which chops and flails the non-grain material back to the field. The operation of combine 10 is controlled from an operator's cab 38.

Although the invention is illustrated as being used on a rotary combine, the present invention can be used on other combine types including conventional straw walker combines and hybrid combines having transverse threshing cylinders and rotary separators.

Figure 2:
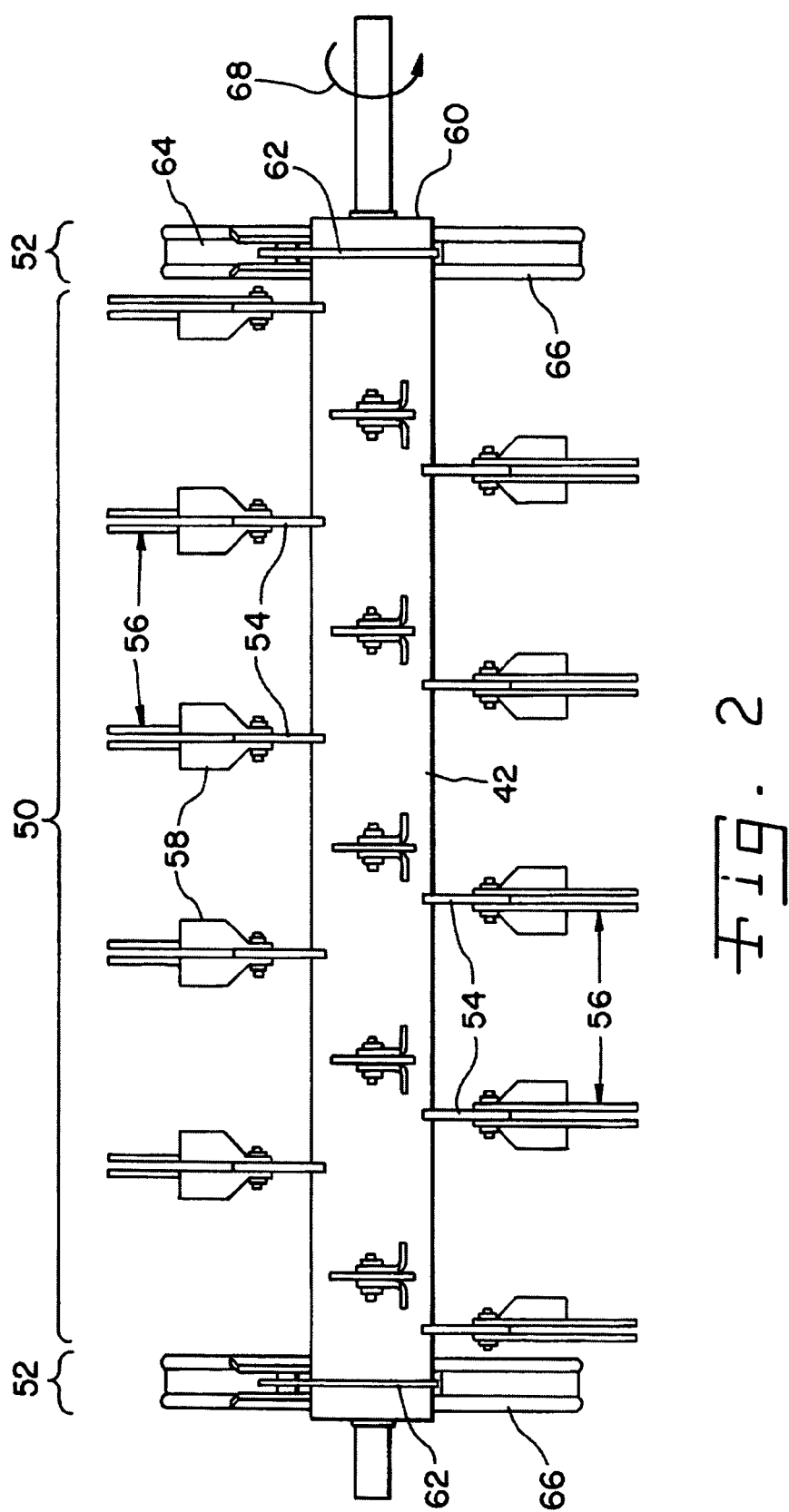
FIG. 2 is a plan view of the chopper section and fan sections of the straw chopper shown in FIG. 1.

Referring now to FIGS. 1 and 2, conjunctively, straw chopper 36 includes a housing 40, rotor 42, and a bank of stationary knives 44. Housing 40 is provided with an inlet 46 for receiving previously processed crop material other than grain and an outlet 48 for discharging the chopped, non-grain crop material back to the field. Housing 40 also carries the bank of stationary knives 44. In FIG. 1, rotor 42 would rotate in a counter-clockwise direction.

Figure 3:
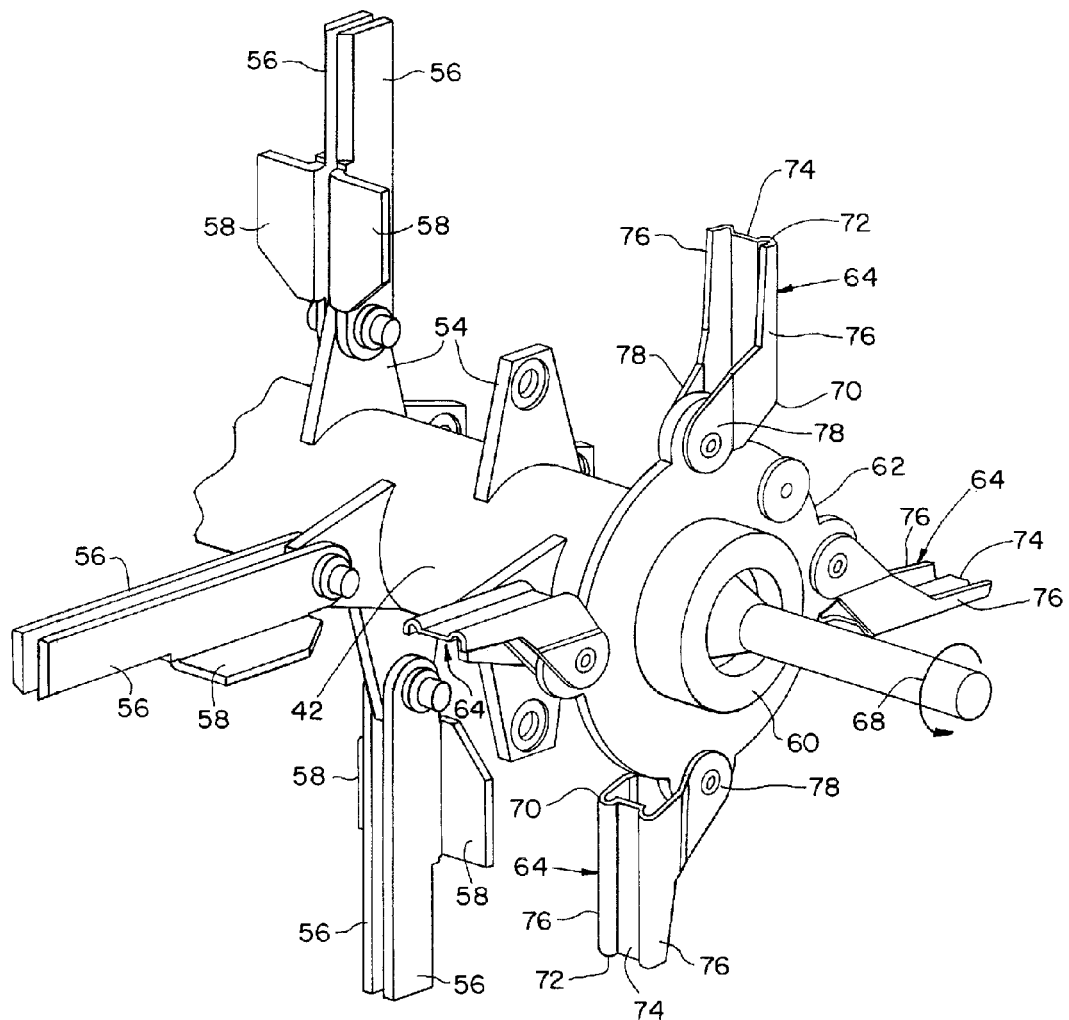
FIG. 3 is a fragmentary, perspective view of the chopper section and one of the fan sections shown in FIG. 2.

Rotor 42, shown in more detail in FIGS. 2 and 3, may be divided into three sections; namely, a center chopping section 50 and a pair of fans 52 at each longitudinal end of chopping section 50. In center chopping section 50, rotor 42 is provided with a plurality of blade mounts 54 for pendulously mounting straw chopper blades 56. Blades 56 include a transversely extending paddle 58, and cooperate with stationary knives 44 to chop the non-grain crop material. Paddles 58 are positioned at the radially inward end of blades 56 to act as fan blades assisting in discharge of the non-grain crop material to the field, without interfering with stationary knives 44.

Figure 4:
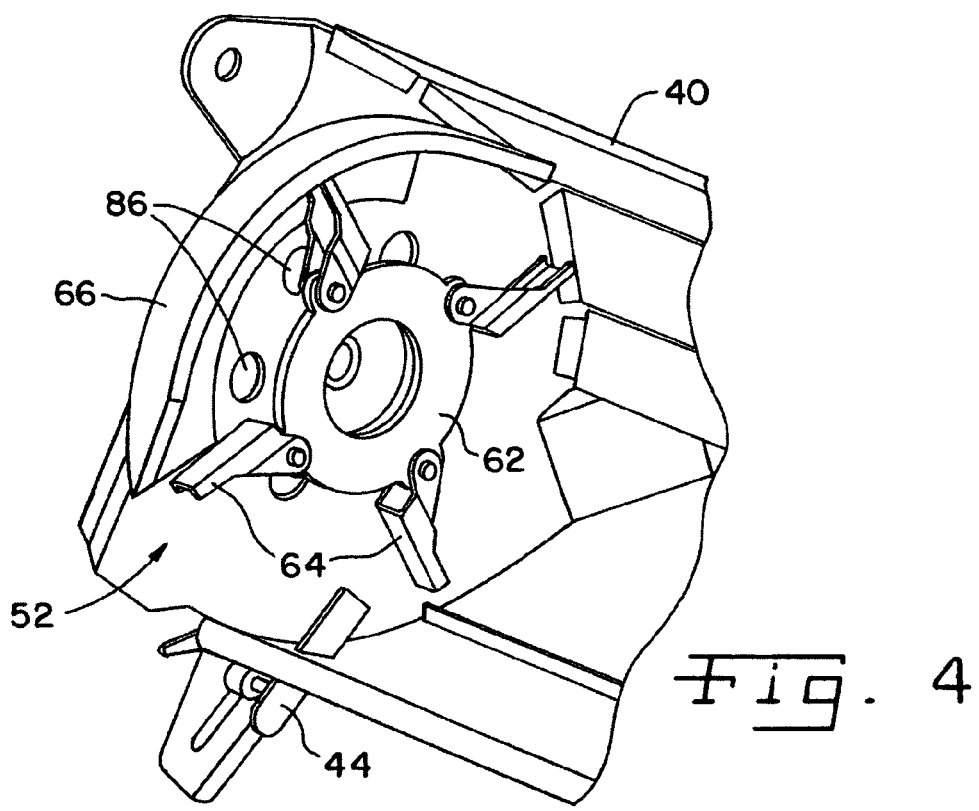
FIG. 4 is a perspective view of an embodiment of a fan section of the present invention installed within a straw chopper.

Referring to FIGS. 2-4, each fan 52 generally includes a hub 60, ring 62, fan blades 64, and scroll housing 66. Hub 60 is rotatable in a direction of rotation as indicated by arrow 68. Ring 62 is mounted to hub 60 and interconnects the plurality of fan blades 64 with hub 60 at a plurality of angularly spaced locations about hub 60 and ring 62. In the embodiment shown, fan 52 includes four fan blades 64, but a different number of fan blades can also be used.

Each fan blade 64 has a mounting or proximal end 70 and a radially outboard or distal end 72. Each fan blade 64 has a generally U-shaped portion as viewed and extending from distal end 72. The U-shaped portion is defined by a rear wall 74 and a pair of side walls 76 extending from rear wall 74 in direction of rotation 68. Each fan blade 64 also has a generally L-shape as viewed perpendicular to one of side walls 76. In other words, each fan blade 64 has a "scoop shape" open in the direction of rotation which assists in directing an enhanced flow of air from straw chopper 36 for better distributing the non-grain material to the field.

Each fan blade 46 is also shown as including a pair of ears 78 extending from respective side walls 76 near proximal end 70. Each ear 78 extends generally in the direction of rotation 68, although also at an acute angle. Ears 78 are mounted on opposite sides of ring 62, and allow free movement of fan blades 64 at the mounting locations with ring 62, such as at rest or during a plugging situation. Of course, centrifugal force during operation causes fan blades 64 to move to the radially outward position as shown in FIG. 3.

Figure 5:
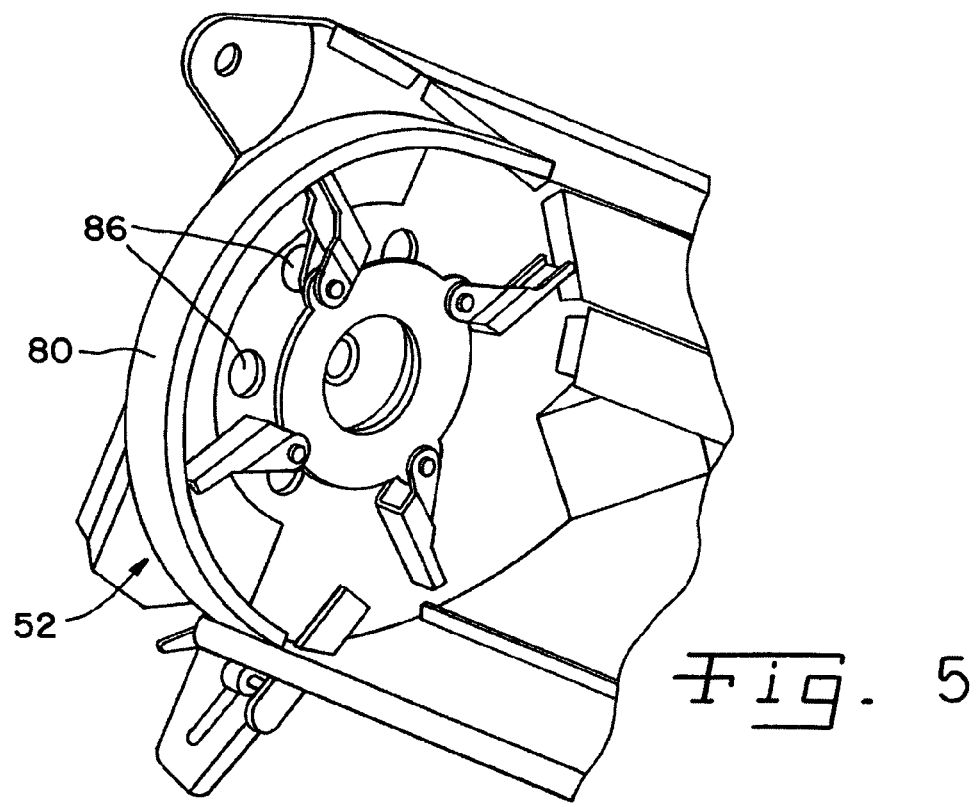
FIG. 5 is a perspective view of another embodiment of a fan section of the present invention installed within a straw chopper.
Figure 6:
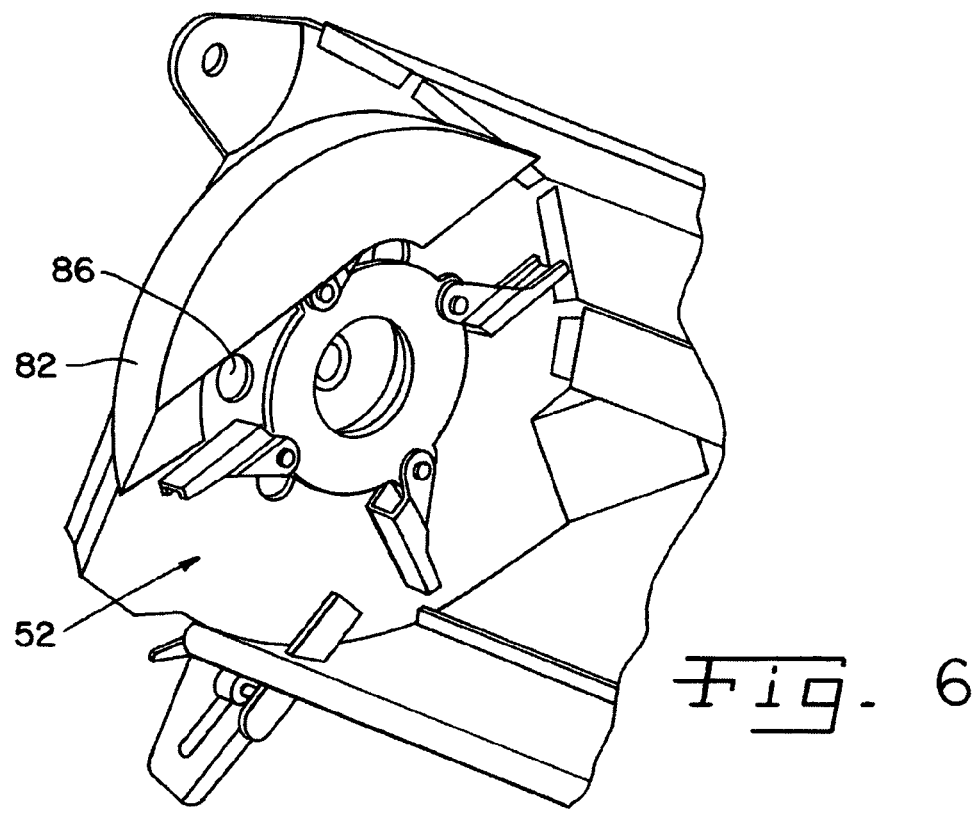
FIG. 6 is a perspective view of yet another embodiment of a fan section of the present invention installed within a straw chopper.
Figure 7:
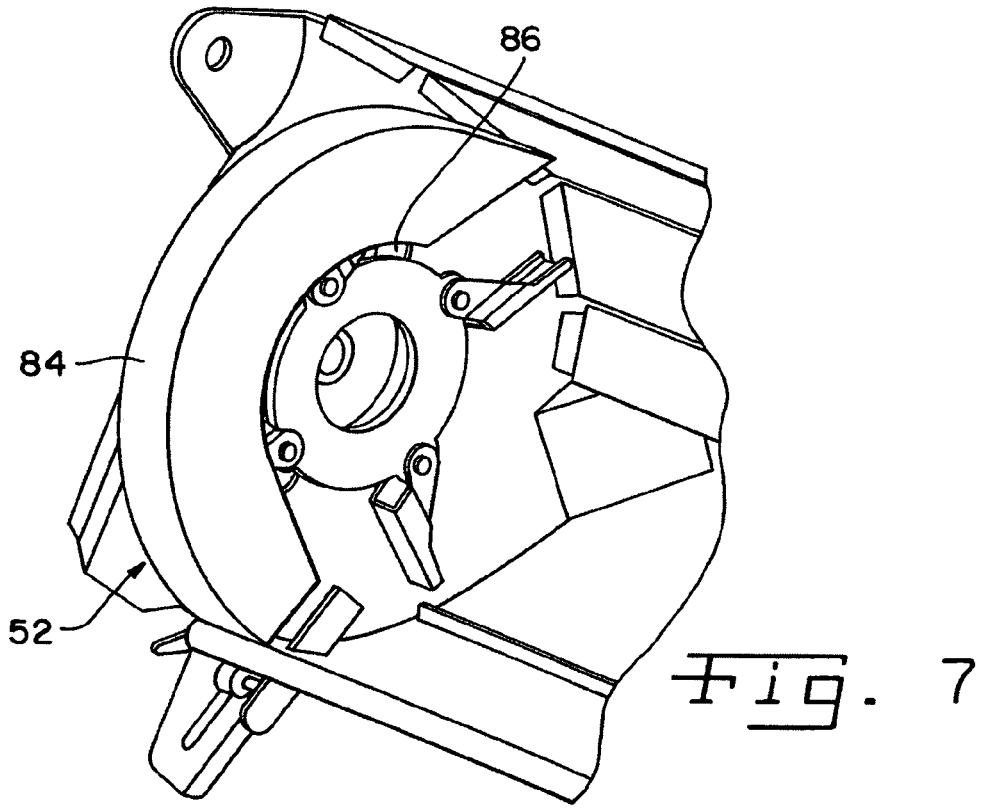
FIG. 7 is a perspective view of a further embodiment of a fan section of the present invention installed within a straw chopper.

Referring to FIGS. 4-7, each fan 52 is also shown as including a scroll housing which may be of different configurations, although such a scroll housing may not be required for certain applications. In the embodiment shown in FIG. 4, scroll housing 66 is in the form of a tapered front scroll housing with shallow sides. Scroll housing 66 assists in directing an enhanced flow of air from straw chopper 36. Other embodiments of scroll housings are shown in FIGS. 5-7. FIG. 5 illustrates a full scroll housing 80 with shallow sides; FIG. 6 illustrates a tapered front scroll housing 82 with deep sides; and FIG. 7 illustrates a full scroll housing 84 with deep sides. The differences are readily apparent and thus not described further.

To also assist in providing enhanced air flow, housing 40 of straw chopper 36 may include a plurality of optional air intake holes 86 at opposite longitudinal ends of rotor 42 (FIGS. 4-7). Air is drawn axially into fans 52 through air intake holes 86 and discharged in a radial direction using fan blades 64.

Having described the preferred embodiment, it will become apparent that various modifications can be made without departing from the scope of the invention as defined in the accompanying claims.

The invention claimed is:

1. A fan for a straw chopper in an agricultural harvesting unit, said fan comprising:
   a hub rotatable in a direction of rotation;
   a plurality of fan blades connected with said hub at a plurality of angularly spaced locations about said hub, each said fan blade having a generally U-shaped portion with a rear wall and a pair of side walls extending from said rear wall in said direction of rotation;
   a ring mounted to said hub, said ring interconnecting said plurality of fan blades; and
   a plurality of blades each having a transversely extending paddle positioned on a leading edge of each said blade, said plurality of blades pendulously extending from said hub.

2. The fan for a straw chopper of claim 1, wherein each said fan blade has a distal end opposite from said hub, said U-shaped portion extending from said distal end toward said hub.

3. The fan for a straw chopper of claim 1, further comprising a plurality of blade mounts connected to said hub, at least one of said plurality of blades being pendulously mounted to a corresponding one of said plurality of blade mounts.

4. The fan for a straw chopper of claim 3, wherein said plurality of blades including a first blade and a second blade, said first blade being configured as a substantially mirror image of said second blade.

5. The fan for a straw chopper of claim 4, wherein said first blade is mounted to one side of one of said plurality of blade mounts, said second blade is mounted to an opposite side of said one of said plurality of blade mounts.

6. The fan for a straw chopper of claim 5, further comprising at least one stationary knife, said paddle of said first blade and said paddle of said second blade not interfering with said at least one stationary knife.

7. The fan for a straw chopper of claim 1, wherein said paddles of said blades act as other fan blades.

8. The fan for a straw chopper of claim 7, wherein said scroll housing includes one of:
   a tapered front scroll housing with shallow sides;
   a full scroll housing with shallow sides;
   a tapered front scroll housing with deep sides; and
   a full scroll housing with deep sides.

9. A straw chopper for an agricultural harvesting unit, comprising:
   a housing;
   a rotor carried by said housing, said rotor including a center chopping section and a pair of fans respectively positioned at longitudinally outboard ends of said center chopping section, each said fan including:
      a hub rotatable in a direction of rotation;
      a plurality of fan blades connected with said hub at a plurality of angularly spaced locations about said hub, each said fan blade having a generally U-shaped portion with a rear wall and a pair of side walls extending from said rear wall in said direction of rotation;
   a ring mounted to said hub, said ring interconnecting said plurality of fan blades; and
   a plurality of blades each having a transversely extending paddle positioned on a leading edge of each said blade, said plurality of blades pendulously extending from said hub.

10. The straw chopper of claim 9, wherein each said fan blade has a distal end opposite from said hub, said U-shaped portion extending from said distal end toward said hub.

11. The straw chopper of claim 10, wherein each said fan blade has a proximal end closest to said hub, each said side wall including an ear adjacent said proximal end.

12. The straw chopper of claim 11, wherein each said ear extends generally in said direction of rotation.

13. The straw chopper of claim 11, further including a ring directly mounted to said hub, each said fan blade having a pair of ears mounted on opposite sides of said ring.

14. The straw chopper of claim 9, wherein each said fan blade has a distal end opposite from said hub, each said fan blade having a generally U-shape as viewed from said distal end, and a generally L-shape as viewed perpendicular to one of said side walls.

15. The straw chopper of claim 9, further including a scroll housing attached to said housing and positioned radially outboard from said plurality of fan blades.

16. The straw chopper of claim 15, wherein said scroll housing includes one of:
a tapered front scroll housing with shallow sides;
a full scroll housing with shallow sides;
a tapered front scroll housing with deep sides; and
a full scroll housing with deep sides.

17. The straw chopper of claim 9, wherein said housing includes at least one air intake hole at opposite ends of said rotor.

18. An agricultural harvesting unit, comprising:
a crop processing unit; and
a straw chopper receiving primarily non-grain crop material from said crop processing unit, said straw chopper including at least one fan, said fan including a hub rotatable in a direction of rotation, and a plurality of fan blades connected with said hub at a plurality of angularly spaced locations about said hub, each said fan blade having a generally U-shaped portion with a rear wall and a pair of side walls extending from said rear wall in said direction of rotation, each said fan blade having a generally U-shape as viewed from said distal end, and a generally L-shape as viewed perpendicular to one of said side walls; and a plurality of blades each having a transversely extending paddle positioned on a leading edge of each said blade, said plurality of blades pendulously extending from said hub.

19. A fan for a straw chopper in an agricultural harvesting unit, said fan comprising:
a hub rotatable in a direction of rotation;
a plurality of fan blades connected with said hub at a plurality of angularly spaced locations about said hub, each said fan blade having a generally U-shaped portion with an open area facing said direction of rotation, each said fan blade having a pivot axis proximate an end of each said fan blade, each said fan blade including a cutout adjacent to said pivot axis;
a scroll housing positioned radially outboard from said plurality of fan blades; and
a plurality of blades each having a transversely extending paddle positioned on a leading edge of each said blade, said plurality of blades pendulously extending from said hub.

20. The fan for a straw chopper of claim 19, wherein said scroll housing is a tapered front scroll housing.

21. The fan for a straw chopper of claim 19, wherein said scroll housing includes one of:
a tapered front scroll housing with shallow sides;
a full scroll housing with shallow sides;
a tapered front scroll housing with deep sides; and
a full scroll housing with deep sides.

\* \* \* \* \*